United States Patent
Tsuzuki

(10) Patent No.: US 11,970,344 B2
(45) Date of Patent: Apr. 30, 2024

(54) APPARATUS AND METHOD FOR CONTROLLING ROBOT ARM

(71) Applicant: DENSO WAVE INCORPORATED, Aichi-pref. (JP)

(72) Inventor: Hiroshi Tsuzuki, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 197 days.

(21) Appl. No.: 17/331,005

(22) Filed: May 26, 2021

(65) Prior Publication Data
US 2021/0371215 A1    Dec. 2, 2021

(30) Foreign Application Priority Data
May 26, 2020    (JP) .................................. 2020-091361

(51) Int. Cl.
*B25J 9/16*    (2006.01)
*B65G 47/91*    (2006.01)

(52) U.S. Cl.
CPC .......... *B65G 47/917* (2013.01); *B25J 9/1666* (2013.01); *B25J 9/1676* (2013.01); *B25J 9/1679* (2013.01); *B65G 47/918* (2013.01); *B65G 2203/0233* (2013.01)

(58) Field of Classification Search
CPC .............. B65G 47/917; B65G 47/918; B65G 2203/0233; B25J 9/1666; B25J 9/1676; B25J 9/1679
See application file for complete search history.

(56) References Cited

U.S. PATENT DOCUMENTS

| 9,718,596 | B1 * | 8/2017 | Russell | B65D 19/0004 |
| 2005/0066627 | A1 * | 3/2005 | Clark | B65B 69/00 53/449 |
| 2017/0282634 | A1 * | 10/2017 | Jones | B65H 5/08 |

(Continued)

FOREIGN PATENT DOCUMENTS

JP    2017-056977 A    3/2017

OTHER PUBLICATIONS

L. Chin, J. Lipton, M. C. Yuen, R. Kramer-Bottiglio and D. Rus, "Automated Recycling Separation Enabled by Soft Robotic Material Classification," 2019 2nd IEEE International Conference on Soft Robotics (RoboSoft), Seoul, Korea (South), 2019, pp. 102-107, doi: 10.1109/ROBOSOFT.2019.8722747. (Year: 2019).*

*Primary Examiner* — Abby Y Lin
*Assistant Examiner* — Dylan M Katz
(74) *Attorney, Agent, or Firm* — Oliff PLC

(57) ABSTRACT

In an apparatus for controlling a robot arm with an end effector for packing workpieces in a box-shaped open container with a bottom wall and at least one side wall, an inner surface of the at least one side wall being covered with a contact prevention sheet having an indefinite shape, a controller determines whether a packing position of a selected workpiece in the box-shaped open container is adjacent to the inner surface of the at least one side wall of the container. The controller instructs the robot arm to move the selected workpiece picked up by the end effector downward while preventing the picked-up workpiece from entering a predetermined safety zone in response to determination that the specified packing position in the box-shaped open container is adjacent to the inner surface of the at least one side wall of the container.

10 Claims, 8 Drawing Sheets

(56) References Cited

U.S. PATENT DOCUMENTS

| | | | | |
|---|---|---|---|---|
| 2020/0047331 A1* | 2/2020 | Chitta | ................... | B25J 13/08 |
| 2020/0078941 A1 | 3/2020 | Oka et al. | | |
| 2020/0391385 A1* | 12/2020 | Oka | ................... | B25J 9/1666 |
| 2021/0179303 A1* | 6/2021 | Dietersberger | ......... | B65B 35/38 |
| 2022/0135347 A1* | 5/2022 | Cohen | ................... | B25J 9/1687 |
| | | | | 700/245 |

* cited by examiner

APPARATUS AND METHOD FOR CONTROLLING ROBOT ARM

CROSS REFERENCE TO RELATED APPLICATIONS

This application is based on and claims the benefit of priority from Japanese Patent Application No. 2020-091361 filed on May 26, 2020, the disclosure of which is incorporated in its entirety herein by reference.

TECHNICAL FIELD

The present disclosure relates to apparatuses and methods for controlling a robot arm.

BACKGROUND

Various production plants and/or productive facilities use a robot system including one or more robot arms for instructing the one or more robot arms to perform predetermined tasks.

For example, such a robot system, which includes a robot arm and a control apparatus for controlling the robot arm, is installed in a factory in which workpieces are sequentially transported on, for example, a conveyor belt to a production line.

The control apparatus instructs the robot arm, which is placed beside the production line, to successively pick up the workpieces sequentially transported on the conveyor belt to thereby successively pick up them from the conveyor belt, and instructs the robot arm to perform a predetermined task using the picked-up workpieces.

For example, Japanese Patent Application Publication No. 2017-56977 discloses a method of causing a robot hand, i.e., a robot arm, to 1. Pick up workpieces
2. Pack the picked-up workpieces in a substantially rectangular-parallelepiped open container or box while arranging the picked-up workpieces on the bottom of the rectangular-parallelepiped open container in a two-dimensional array

SUMMARY

If such a packing method using a robot arm is used to pack workpieces that require hygienic handling, such as packaged frozen foods, the packing method needs to pack the workpieces in a rectangular-parallelepiped open container with sufficient attention given to hygiene.

In addition, water droplets may adhere to the package of each workpiece, such as each packaged frozen food. For this reason, if a water-sensitive open container, such as an open cardboard container, is used as the rectangular-parallelepiped open container, direct physical contact between the water-sensitive open container and the package of a workpiece to which water droplets adhere may cause water to permeate into the water-sensitive open container. This may result in the water-sensitive open container being damaged.

For addressing the problem with sufficient attention given to hygiene, a packing method using a robot arm performs a preliminary process before actually packing workpieces into a rectangular-parallelepiped open container. The preliminary process prepares a contact prevention sheet, such as a plastic sheet or a vinyl-bag sheet, which has an indefinite shape and a size with a certain width of margin; the size of the sheet is enough to cover the inner surfaces of all the side and bottom walls of the rectangular-parallelepiped open container. Then, the preliminary process covers the inner surfaces of all the side and bottom walls of the rectangular-parallelepiped open container with the contact prevention sheet.

In particular, the preliminary process covers the inner surfaces of all the side and bottom walls of the rectangular-parallelepiped open container with the contact prevention sheet, so that the margin of the contact prevention sheet projects from the top of each side wall of the rectangular-parallelepiped open container. Then, the preliminary process folds back the projecting margin of the contact prevention sheet outward to thereby simply engage the contact prevention sheet with the rectangular-parallelepiped open container without complete fixture, i.e., reliable fixture, such as adhesion, of the contact prevention sheet to the rectangular-parallelepiped open container.

When controlling a robot arm to transfer a workpiece picked up by the robot arm from a conveyor belt to a target position in the rectangular-parallelepiped open container covered with the contact prevention sheet, a control apparatus typically causes the robot arm to (i) move such that the picked-up workpiece is located above the target position, and thereafter (ii) move vertically downward.

If the target position for a workpiece picked up by the robot arm is positioned close to a side wall of the rectangular-parallelepiped open container covered with the contact prevention sheet, the movement operations of the robot arm may cause the workpiece picked up by the robot arm to contact with a part of the contact prevention sheet, which covers the side wall. If the workpiece picked up by the robot arm contacts with a part of the contact prevention sheet, which covers the side wall, there will be at least one of the following risks:

The first risk is that the workpiece picked up by the robot arm falls down so that the transportation of the workpiece to the target position is failed.

The second risk is that at least the part of the contact prevention sheet is detached from the side wall.

The at least one of the risks may result in time and trouble that are required for performing the preliminary process and thereafter the actual transportation process again.

In view of the circumstances, an exemplary aspect of the present disclosure seeks to provide apparatuses and methods for controlling a robot arm to transport a workpiece picked up by the robot arm into a rectangular-parallelepiped open container with a bottom wall and at least one side wall covered with a contact prevention sheet. Each of the apparatuses and methods of the exemplary aspect is capable of preventing a workpiece picked up by the robot arm from contacting with a part of the contact prevention sheet, which covers the at least one side wall of the rectangular-parallelepiped open container.

According to a first exemplary aspect of the present disclosure, there is provided an apparatus for controlling a robot arm with an end effector for packing one or more workpieces in a box-shaped open container with a bottom wall and at least one side wall. An inner surface of the at least one side wall is covered with a contact prevention sheet having an indefinite shape. The apparatus includes a position specifying unit configured to specify a position in the box-shaped open container at which a selected workpiece among the one or more workpieces is located. The apparatus includes an operation controlling unit configured to (1) Instruct the robot arm to pick up the selected workpiece with the end effector (2) Determine whether the position specified by the position specifying unit in the box-shaped open container is adjacent to the inner surface of the at least one side wall of the container (3) Instruct the robot arm to move the selected workpiece picked up by the end effector of the robot arm downward while preventing the selected workpiece picked up by the end effector of the robot arm from entering a predetermined safety zone in response to determination that the position specified by the position specifying unit in the box-shaped open container is adjacent to the inner surface of the at least one side wall of the container The safety zone represents an internal space of the container defined between the inner surface of the at least one side wall and a virtual plane that is parallel to the at least one side wall and is separated away therefrom by a predetermined safety distance in a horizontal direction perpendicular to the at least one side wall and the virtual plane.

According to a second exemplary aspect of the present disclosure, there is provided a computer-implemented method for controlling a robot arm with an end effector for packing one or more workpieces in a box-shaped open container with a bottom wall and at least one side wall. An inner surface of the at least one side wall is covered with a contact prevention sheet having an indefinite shape. The computer-implemented method includes (i) specifying a position in the box-shaped open container at which a selected workpiece among the one or more workpieces is located;

(ii) instructing the robot arm to pick up the selected workpiece with the end effector;

(iii) determining whether the position specified by the position specifying unit in the box-shaped open container is adjacent to the inner surface of the at least one side wall of the container; and (iv) instructing the robot arm to move the selected workpiece picked up by the end effector of the robot arm downward while preventing the selected workpiece picked up by the end effector of the robot arm from entering a predetermined safety zone in response to determination that the position specified by the position specifying unit in the box-shaped open container is adjacent to the inner surface of the at least one side wall of the container.

The safety zone represents an internal space of the container defined between the inner surface of the at least one side wall and a virtual plane that is parallel to the at least one side wall and is separated away therefrom by a predetermined safety distance in a horizontal direction perpendicular to the at least one side wall and the virtual plane.

In each of the first and second aspects of the present disclosure, if it is deter mined that the position specified by the position specifying unit or the specifying step in the box-shaped open container is adjacent to the inner surface of the at least one side wall of the container, the workpiece picked up by the end effector of the robot arm may contact with a part of the contact prevention sheet that covers the inner surface of the at least one side wall of the box-shaped open container due to, for example, the indefinite shape of the contact prevention sheet.

From this viewpoint, the operation controlling unit or the instructing step (iv) instructs the robot arm to move the selected workpiece picked up by the end effector of the robot arm downward while preventing the selected workpiece picked up by the end effector of the robot arm from entering the predetermined safety zone in response to determination that the position specified by the position specifying unit in the box-shaped open container is adjacent to the inner surface of the at least one side wall of the container.

The safety zone represents the internal space of the container defined between the inner surface of the at least one side wall and the virtual plane that is parallel to the at least one side wall and is separated away therefrom by the predetermined safety distance in the horizontal direction perpendicular to the at least one side wall and the virtual plane.

The safety distance is, for example, previously determined to a distance that ensures a size of the safety zone, which disables, upon full consideration of variations in the indefinite shape of the contact prevention sheet, the part of the contact prevention sheet covering the inner surface of the at least one side wall from interfering with the workpiece picked-up by the end effector of the rotor arm during the downward movement of the end effector of the robot arm.

This sufficiently reduces, even if the specified position is adjacent to the inner surface of the at least one side wall of the box-shaped open container, a possibility that the workpiece picked-up by the end effector of the robot arm contacts with the part of the contact prevention sheet covering the inner surface of the at least one side wall during downward movement of the workpiece picked-up by the end effector of the robot arm. This therefore makes it possible to avoid a workpiece from contacting with the part of the contact prevention sheet covering the at least one side wall during packing of the workpiece into the box-shaped open container.

This prevents the occurrence of (1) One risk that the workpiece picked up by the end effector of the robot arm falls down so that the transportation of the workpiece to the specified position is failed (2) An additional risk that at least the part of the contact prevention sheet is detached from the at least one side wall In a preferred embodiment of each of the first and second aspects of the present disclosure, the operation controlling unit or the instructing step (iv) instructs, in response to determination that the position specified by the position specifying unit or specifying step in the box-shaped open container is adjacent to the inner surface of the at least one side wall of the container, instruct the robot arm to perform (1) A first motion that moves the end effector to thereby locate an outer edge of the workpiece picked-up by the end effector, which is the closest to the at least one side wall of the box-shaped open container, at an offset position, the offset position being offset by the safety distance relative to the at least one side wall of the box-shaped open container in the horizontal direction (2) A second motion that moves the end effector straightly downward until the workpiece picked up by the end effector reaches a predetermined height position (3) A third motion that moves the end effector toward the packing position specified by the position specifying unit This therefore reliably prevents the workpiece picked up by the end effector of the robot arm from entering the safety zone defined with respect to the at least one side wall of the box-shaped open container during the second motion of the robot arm that moves the end effector straightly downward, making it possible to reliably prevent the workpiece picked up by the end effector of the robot arm from contacting with the part of the contact prevention sheet covering the at least one side wall.

In another preferred embodiment of the first aspect, the box-shaped open container has a first side wall as the at least one side wall, and a second side wall adjacent to the first side wall, and the predetermined safety zone includes a first safety zone and a second safety zone. The first safety zone represents a first internal space of the container defined between the inner surface of the first side wall and a first virtual plane that is parallel to the first side wall and is separated away therefrom by a predetermined first safety distance in a first horizontal direction perpendicular to the first side wall and the first virtual plane. The second safety zone represents a second internal space of the container defined between the inner surface of the second side wall and a second virtual plane that is parallel to the second side wall and is separated away therefrom by a predetermined second safety distance in a second horizontal direction perpendicular to the second side wall and the second virtual plane. The operation controlling unit is configured to instruct the robot arm to move the selected workpiece picked up by the end effector of the robot arm downward while preventing the selected workpiece picked up by the end effector of the robot arm from entering each of the first safety zone and the second safety zone in response to determination that the position specified by the position specifying unit in the box-shaped open container is adjacent to the inner surface of the first side wall and the inner surface of the second side wall of the box-shaped open container.

This therefore prevents, even if the specified position is adjacent to an inner corner of the box-shaped open container between the first and second adjacent side walls, the workpiece from contacting with parts of the contact prevention sheet covering the respective first and second adjacent side walls of the box-shaped open container during packing of the workpiece into the box-shaped open container.

In a further preferred embodiment of the first aspect, the operation controlling unit is configured to, in response to determination that the position specified by the position specifying unit in the box-shaped open container is adjacent to the inner surface of the at least one side wall of the container, instruct the robot arm to perform
(1) A fourth motion that releases the workpiece picked up by the end effector of the robot arm to thereby detach the workpiece from the end effector, so that the detached workpiece is located at the packing position specified by the position specifying unit
(2) A fifth motion that moves the end effector of the robot arm straightly upward along a height direction of the container after the fourth motion Although the end effector of the robot arm rises immediately above with a part of the end effector being within the safety zone, because no workpiece is grasped by the rising end effector, there is no need to consider contact between the workpiece and the part of the contact prevention sheet covering the at least one side wall of the box-shaped open container.

This therefore reduces the operation time of the robot arm after the workpiece is located at the position specified by the region specifying unit, resulting in a total cycle time required to locate the one or more workpieces in the box-shaped open container being shorter.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes an exemplary embodiment of the present disclosure with reference to the accompanying drawings.

Figure 1:
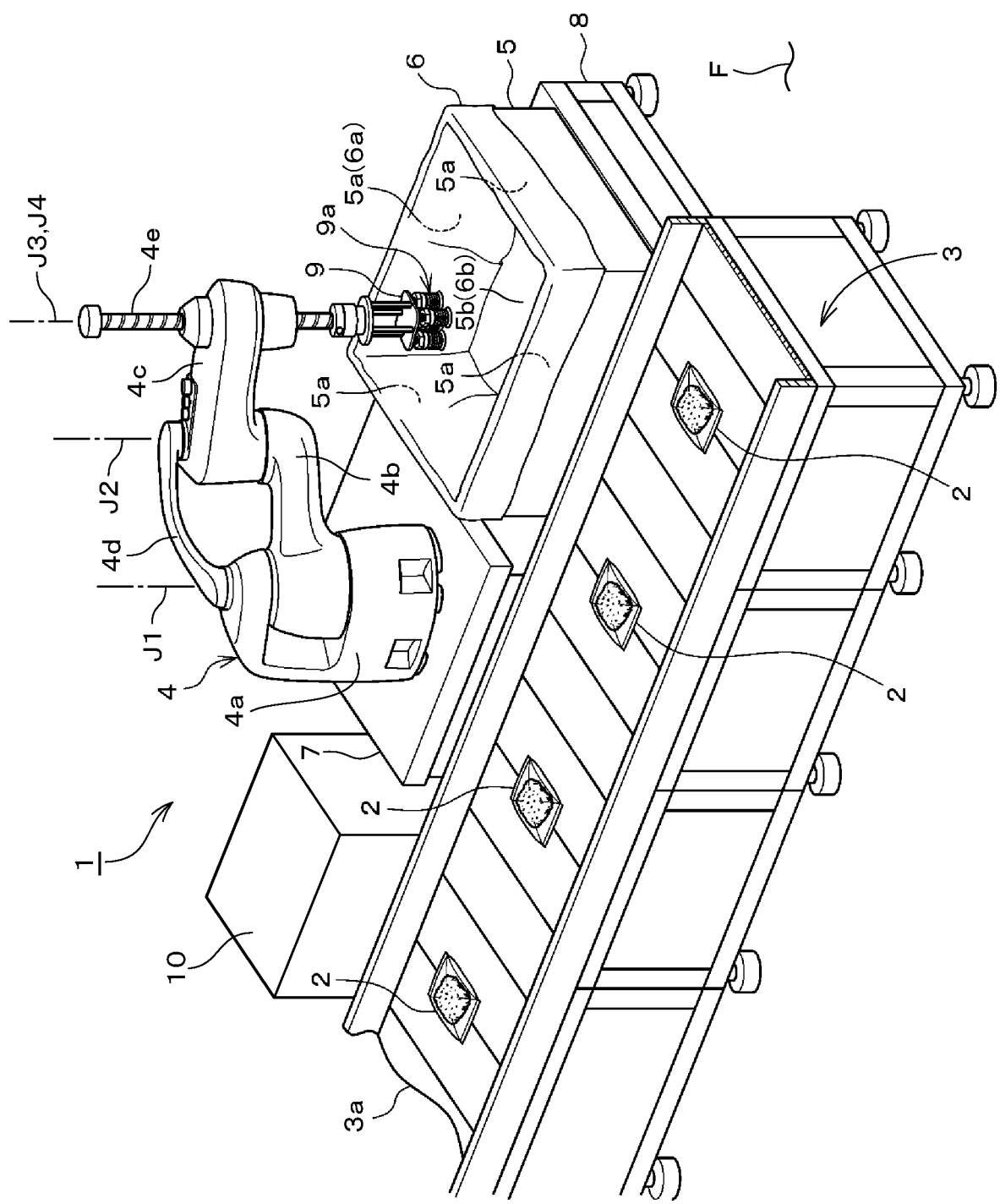
FIG. 1 is a perspective view schematically illustrating a configuration of a production system according to an exemplary embodiment of the present disclosure.

FIG. 1 schematically illustrates a production system 1 installed in, for example, a production factory according to the exemplary embodiment.

The production system 1 includes a belt conveyor apparatus 3, a robot arm 4 mounted on a robot table 7, a controller 10, which serves as an apparatus for controlling the robot arm 4, and a rectangular-parallelepiped open container, i.e., a box-shaped open container, 5 mounted on a container table 8.

The production system 1 is installed in a production line in which workpieces 2 are sequentially transported on a moving conveyor belt 3a of the belt conveyor apparatus 3. The belt conveyor apparatus 3 is mounted on a floor F of the production factory, and the conveyor belt 3a has a predetermined height relative to the floor F.

The controller 5 of the production system 1 is configured to cause the robot arm 4 to sequentially pick up the workpieces 2 sequentially transported on the conveyer belt 3a, and cause the robot arm 4 to pack the picked-up workpieces 2 in the rectangular-parallelepiped open container 5 while arranging the picked-up workpieces 2 on the bottom of the rectangular-parallelepiped open container 5 in a two-dimensional array.

The belt conveyor apparatus 3 serves as a conveyor apparatus for continuously transporting the workpieces 2 on the moving conveyor belt 3a.

Each workpiece 2 according to the exemplary embodiment has a substantially rectangular plate-like shape, and is comprised of a product and a package that packs the product, and water droplets may adhere to the package of the corresponding workpiece 2. For example, each workpiece 2 is comprised of a frozen food and a package that packs the frozen food, so that water droplets may adhere to the package of the corresponding workpiece 2 due to condensation on the package.

The workpieces 2 are mounted on the conveyor belt 3a, and the belt conveyor apparatus 3 is configured to move the conveyor belt 2 at constant speed, so that the workpieces 2 are sequentially transported on the conveyor belt 3a.

The robot arm 4 is designed as, for example, a horizontal articulated robot arm with four axes.

Specifically, as illustrated in FIG. 1, the robot arm 4 is comprised of a base 4a, a first arm member, i.e., link 4b, a second arm member 4c, an auxiliary arm member 4d, a shaft 4e, and a hand 9. Each of the arm members 4b to 4d has opposing first and second ends, and the shaft 4e has opposing first and second ends.

The base 4a, which has, for example, a substantially cylindrical shape, is mounted on the robot table 7. The base 4a supports the first end of the first arm member 4b to be rotatable about a vertical first axis J1 that corresponds to the center axis of the base 4a. The base 4a additionally supports the first end of the auxiliary arm member 4d to be rotatable about the vertical first axis J1.

The first end of the second arm member 4c is rotatably supported by the second end of each of the first arm member 4b and the auxiliary arm member 4d about a vertical second axis J2.

The shaft 4e is rotatably supported by the second end of the second arm member 4c about a vertical third axis J3. The shaft 4e is coaxial to the vertical third axis J3 to be linearly movable along a vertical fourth axis J4 that corresponds to the third axis J3. The hand 9, which serves as an end effector for grasping, i.e., picking up, a workpiece 2, is mounted to the second end, i.e., the lower end, of the shaft 4e.

The first end of the first arm member 4b that is rotatably supported by the base 4a works as, for example, a first joint in which a rotatable shaft, a motor, and a brake mechanism are installed. The motor is coupled to the rotating shaft, and is configured to rotate the rotating shaft, i.e., the first arm 4b, about the vertical first axis J1 when driven, and the brake mechanism is capable of braking rotation of the first arm member 4a about the vertical first axis J1 when driven. For example, the motor is also configured to rotate the auxiliary arm member 4d together with the first arm 4b.

Similarly, the first end of the second arm member 4c that is rotatably supported by the first end of each of the first arm member 4b and auxiliary arm member 4d works as, for example, a second joint in which a rotatable shaft, a motor, and a brake mechanism are installed. The motor is coupled to the rotating shaft, and is configured to rotate the rotating shaft, i.e., the second arm member 4c, about the vertical second axis J2 when driven, and the brake mechanism is capable of braking rotation of the second arm member 4c about the vertical second joint J2 when driven.

The second end of the second arm member 4c that supports the shaft 4e to be rotatable and linearly movable works as, for example, a third joint in which first and second motors and first and second brake mechanisms are installed. The first motor is configured to rotate the shaft 4e about the vertical third axis J3 when driven, and the second motor is configured to linearly move the shaft 4e along the vertical fourth axis J4 when driven. The first brake mechanism is capable of braking rotation of the shaft 4e about the vertical third axis J3 when driven, and the second brake mechanism is capable of braking liner movement of the shaft 4e along the vertical fourth axis J4 when driven.

In the first joint, an encoder is installed; the encoder continuously measures a current rotational position of the rotating shaft of the first joint, thus continuously measuring a current rotational position of the first arm member 4b relative to a reference position. Then, the encoder continuously outputs, to the controller 10, a feedback signal indicative of the current rotational position of the first arm member 4b.

In the second joint, an encoder is installed; the encoder continuously measures a current rotational position of the rotating shaft of the second joint, thus continuously measuring a current rotational position of the second arm member 4c relative to a reference position. Then, the encoder continuously outputs, to the controller 10, a feedback signal indicative of the current rotational position of the second arm member 4c.

In the third joint, first and second encoders are installed. The first encoder continuously measures a current rotational position of the shaft 4e relative to a reference position, and continuously outputs, to the controller 10, a feedback signal indicative of the current rotational position of the shaft 4e. The second encoder continuously measures a current linear movement position of the shaft 4e relative to a reference position, and continuously outputs, to the controller 10, a feedback signal indicative of the current linear movement position of the shaft 4e.

Figure 2:
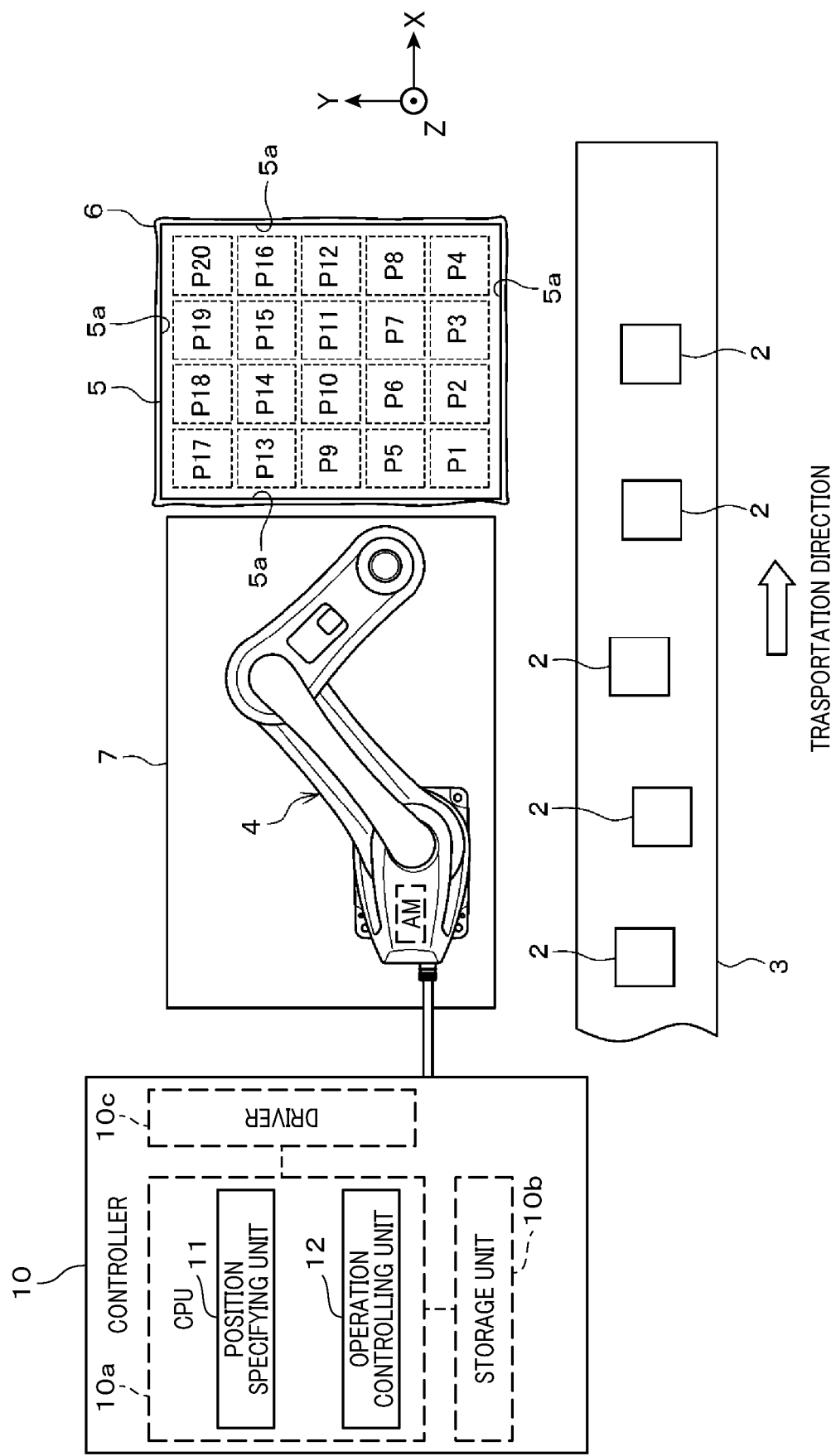
FIG. 2 is a plan view of the production system illustrated in FIG. 1, which illustrates packing positions for workpieces in a rectangular-parallelepiped open container illustrated in FIG. 1.

As illustrated in FIG. 2, these motors, brake mechanisms, and encoders installed in the rotor arm 4 are collectively illustrated as an arm actuating mechanism AM.

The rectangular-parallelepiped open container 5, which will be referred to simply as a container 5, is comprised of a bottom wall 5b and four side walls 5a vertically extending from the respective four sides of the bottom wall 5b.

The exemplary embodiment uses a water-sensitive rectangular-parallelepiped open container, such as a rectangular-parallelepiped open cardboard container, as the container 5. Because the container 5 is sensitive to water, direct physical contact between the container 5 and the package of a workpiece 2 to which water droplets may adhere may cause water to permeate into the water-sensitive open container. This may result in the container 5 becoming swollen and therefore being deformed or ripped. In addition, if each workpiece 2 requires hygienic handling, such as a packaged frozen food, it is necessary to pack the workpieces 2 in the container 5 with sufficient attention given to hygiene.

From this viewpoint, a contact prevention sheet, such as a plastic sheet or a vinyl-bag sheet, 6 is prepared as an example of a contact prevention sheet; the contact prevention sheet 6 has an indefinite shape and a size with a certain length of margin; the size of the sheet 6 is enough to cover the inner surfaces of all the side and bottom walls 5a and 5b of the container 5. Then, the inner surfaces of all the side and bottom walls 5a and 5b of the container 5 are covered with the contact prevention sheet 6.

In particular, the inner surfaces of all the side and bottom walls 5a and 5b of the container 5 are covered with the contact prevention sheet 6, so that the margin of the contact prevention sheet 6 projects from the top of each side wall 5a of the container 5. Then, the projecting margin of the contact prevention sheet 6 is folded back outward, so that the contact prevention sheet 6 is simply engaged with the container 5 without being complete fixed, i.e., reliably fixed, such as adhered, to the container 5.

As described above, the robot arm 4 and the container 5 are respectively mounted on the robot table 7 and the container table 8. The height of each of the robot table 7 and the container table 8 with respect to the floor F is determined, which enables the hand 9 of the robot arm 4 to be movable from the bottom 5b of the container 5 to the opening top thereof.

The hand 9 of the robot arm 4 is equipped with, for example, four suction mechanisms 9a; each of the four suction mechanisms 9a is capable of suctioning a selected workpiece 2 to grasp the suctioned workpiece 2, and of releasing the suctioning of the workpiece 2 to thereby detach the gasped workpiece 2 from the suction mechanisms 9a.

Specifically, the controller 10 performs a pick-up process that
(1) Instructs the robot arm 4, i.e., the arm actuating mechanism AM, to rotate to thereby locate the hand 9 of the robot arm 4 to a predetermined pickup position of the belt conveyor apparatus 3 above the conveyor belt 3a
(2) Instructs the robot arm 4, i.e., the arm actuating mechanism AM, to move the hand 9 of the robot arm 4 downward to be close to the predetermined pickup position of the belt conveyor apparatus 3 while a workpiece 2 moves toward the predetermined pickup position of the belt conveyor apparatus 3 above the conveyor belt 3a
(3) Instructs the suction mechanisms 9a to suction the workpiece 2 when the workpiece 2 reaches the predetermined pickup position of the belt conveyor apparatus 3 above the conveyor belt 3a, thus picking up the workpiece 2

Next, the controller 10 performs a packing process that
(1) Instructs the robot arm 4, i.e., the arm actuating mechanism AM, to move the hand 9 of the robot arm 4 upward to a predetermined height that is, for example, higher by a preset length than the height of the top of the container 5
(2) Instructs the robot arm 4, i.e., the arm actuating mechanism AM, to rotate to thereby locate the hand 9 of the robot arm 4 above a predetermined target position on the bottom wall 5b of the container 5
(3) Instructs the robot arm 4, i.e., the arm actuating mechanism AM, to move the hand 9 of the robot arm 4 downward to be close to the predetermined target position on the bottom wall 5b of the container 5
(4) Instructs the suction mechanisms 9a to release the suctioned target workpiece 2 to thereby detach the target workpiece 2 from the suction mechanisms 9a, so that the selected target workpiece 2 is mounted on the predetermined target position on the bottom wall 5b of the container 5 through the contact prevention sheet 6

The controller 10 is programmed to repeatedly perform a sequence of the pick-up process and packing process each time a workpiece 2 approaches the predetermined pickup position on the moving conveyor belt 3a, thus sequentially packing the workpieces 2 in the container 5.

The controller 10, which is configured to control operations of the robot arm 4, is comprised of, for example, a computer that includes a central processing unit (CPU), i.e., a processor, 10a and a storage unit 10b comprised of, for example, a ROM and a RAM. The CPU 10a of the controller 10 for example can run one or more programs, i.e., program instructions, stored in the storage unit 10b, thus controlling operations of the robot arm 4.

Specifically, the controller 10 includes a driver 10c, which is comprised of, for example, an inverter circuit. The driver 10c is communicably connected to the CPU 10a. The CPU 10a of the controller 10 is configured to receive the feedback signals continuously outputted from the respective encoders of the arm actuating mechanism AM, and to perform, through the driver 10c, feedback control of the motors and/or brake mechanisms in accordance with the received feedback signals, and the movement speed of the conveyor belt 3a, thus causing the robot arm 4 to repeatedly perform the sequence of the pick-up process and packing process.

More specifically, the CPU 10a of the controller 10 is configured to run predetermined programs stored in the storage unit 10b to thereby implement various functions including a position specifying unit 11 and an operation controlling unit 12.

The position specifying unit 11 and the operation controlling unit 12 perform, through the driver 10c, feedback control of the motors and/or brake mechanisms of the arm actuating mechanism AM in accordance with the received feedback signals sent from the encoders of the arm actuating mechanism AM, thus causing each arm and screw to automatically perform previously programmed motions.

In place of the position specifying unit 11 and the motion controlling unit 12 being implemented by the one or more programs, i.e., software, the position specifying unit 11 and the operation controlling unit 12 can be implemented by one or more hardware devices, such as one or more ICs. At least part of the position specifying unit 11 and the operation controlling unit 12 can be implemented by one or more hardware devices.

Note that each point in the production factory, to which the robot arm 4 can move a predetermined reference point of the suction mechanisms 9a of the hand 9, is previously defined as coordinates in a predetermined three-dimensional coordinate system that is, for example, stored in the storage unit 10b. In other words, the CPU 10a of the controller 10 is capable of controlling, via the driver 10c, at least one motor and/or at least one brake mechanism in accordance with the feedback signals to thereby move the reference point of the suction mechanism 9a to any point in the three-dimensional coordinate system.

Because the pickup position of the belt conveyor apparatus 3 is located within the three-dimensional coordinate system, the controller 10 enables the robot arm 4 to operate such that the suction mechanism 9a is located to the pickup position of the belt conveyor apparatus 3, making it possible for the suction mechanism 9a to suction the workpieces 2 on the moving conveyor belt 3a.

Similarly, because the container 5 is located within the three-dimensional coordinate system, the controller 10 enables the robot arm 4 to operate such that the suction mechanism 9a can pack a suctioned workpiece 2 in the container 5.

The position specifying unit 11 is configured to specify a packing position for a workpiece 2 in the container 5 for each sequence of the pick-up process and packing process. The operation controlling unit 12 is configured to control, through the driver 10c, operations of the robot arm 4 to cause the robot arm 4 to
(1) Pick up a workpiece 2 when the workpiece 2 reaches the predetermined pickup position based on movement of the conveyor belt 3a
(2) Locate the picked-up workpiece 2 into the specified packing position in the container 5

As illustrated in FIG. 2, the conveyor belt 3a of the belt conveyor apparatus 3 is arranged to extend in a predetermined first horizontal direction, i.e., an X direction, corresponding a left-right direction in FIG. 2, so that the workpieces 2 are carried by the conveyor belt 3a in the X direction from left to right (see an open arrow in FIG. 2).

That is, the conveyor belt 3a has a longitudinal direction corresponding to the X direction in FIG. 2, and a lateral direction corresponding to a top-bottom direction in FIG. 2, i.e., a second horizontal direction or a Y direction, in FIG. 2; an X-Y plane, i.e., a horizontal plane, defined by the X direction and the Y direction is perpendicular to the height direction of the container 5; the height direction will be referred to as a Z direction.

Figure 3:
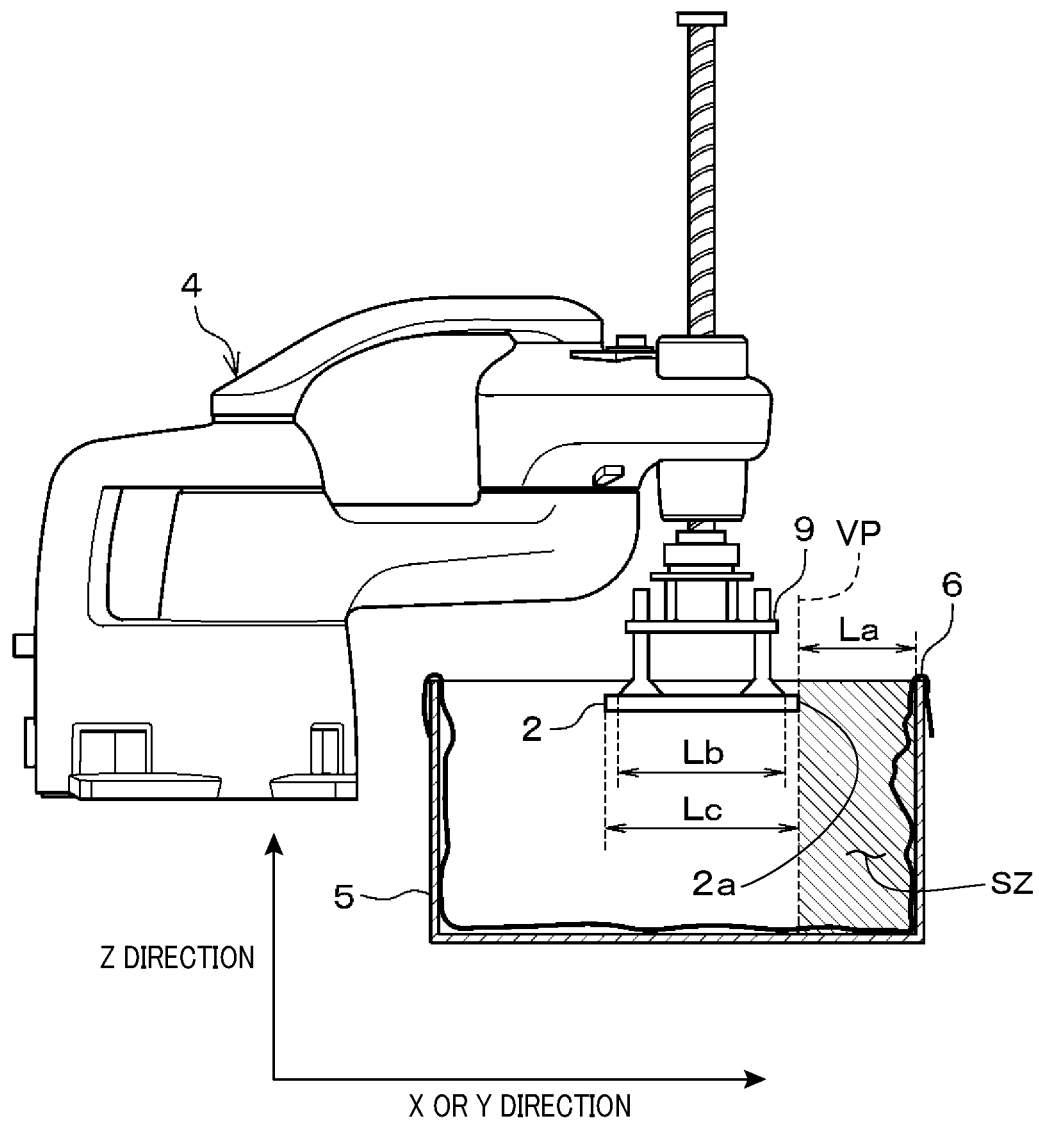
FIG. 3 is a view schematically illustrating how operations of a robot arm illustrated in FIG. 1 are controlled.

For example, as illustrated in FIGS. 1 and 3, the four suction mechanisms 9a each have a cylindrical tubular shape with a constant axial length. The lower end of each of the four suction mechanisms 9a is a nozzle, so that each of the four suction mechanisms 9a is capable of suctioning a workpiece 2 through the nozzle, and releasing the suctioned workpiece 2 from the nozzle. The nozzles of the four suction mechanisms 9a constitute a substantially a square outline with equal four sides (see Lb in FIG. 3).

Additionally, each workpiece 2, which has a substantially rectangular plate-like shape, has opposing two longer sides and opposing two shorter sides (see Lc in FIG. 3).

That is, the size of the square outline of the nozzles of the four suction mechanisms 9a in cross section of the X-Y plane is smaller than the size of the workpiece 2 in cross section of the X-Y plane (see FIG. 3).

FIG. 2 illustrates the appearance of the production system 1 including the container 5 from above in the Z direction.

The size of the bottom wall 5b of the container 5 is previously determined to enable plural workpieces 2 to be packed on a part of the contact prevention sheet 6 on the bottom wall 5b. The part of the contact prevention sheet 6 covering the inner surface of the bottom wall 5b will be referred to as a bottom part 6b of the contact prevention sheet 6.

For example, as illustrated in FIG. 2, the bottom wall 5b of the container 5 has a longitudinal side along the Y direction, and a lateral direction along the X direction. The rectangular size of the bottom wall 5b enables the total twenty workpieces 2, which is comprised of five workpieces 2 in the longitudinal side and four workpieces 2 in the lateral side, to be packed on the bottom part 6b of the contact prevention sheet 6.

The size of each side wall 5a of the container 5 is determined to enable the set of the twenty workpieces 2 to be stacked on each other in layers.

FIG. 2 schematically illustrates the packing positions of the respective twenty workpieces 2 on or above the bottom part 6b of the contact prevention sheet 6 mounted on the bottom wall 5b of the container 5 when the packing positions are viewed from above in the Z direction.

From the closest side wall 5a of the container 5 to the conveyor belt 3a to the farthest side wall 5a of the container 5 from the conveyor belt 3a, a first set of four packing positions P1 to P4, a second set of four packing positions P5 to P8, a third set of four packing positions P9 to P12, a fourth set of four packing positions P13 to P16, and a fifth set of four packing positions P17 to P20 are deter mined on or above the bottom part 6b of the contact prevention sheet 6 mounted on the bottom wall 5b of the container 5.

The position specifying unit 11 is configured to
(1) Sequentially specify the packing positions P1 to P20 from the packing position P1 in ascending order up to the packing position P20, so that a first stack of twenty workpieces 2 are packed in the respective packing positions P1 to P20
(2) Sequentially specify the packing positions P1 to P20 from the packing position P1 in ascending order up to the packing position P20, so that a second stack of twenty workpieces 2 are packed in the respective packing positions P1 to P20 on the first stack
(3) Repeat specifying of the packing positions P1 to P20 until the number of stacks reaches an upper limit The above sequence of the pick-up process and packing process results in some workpieces 2 being located adjacent to a part of the contact prevention sheet 6 covering each side wall 5a. The part of the contact prevention sheet 6 covering a side wall 5a will be referred to as a side part 6a of the contact prevention sheet 6.

As described above, because some workpieces 2 need be arranged adjacent to each side wall 5a of the container 5 via the corresponding one of the side parts 6a of the contact prevention sheet 6, the hand 9 of the robot arm 4 is equipped with the suction mechanisms 9a.

That is, let us assume that the hand 9 of the robot arm 4 is equipped with a clamp mechanism; the clamp mechanism is comprised of two fingers that are closed in an initial state. The clamp mechanism is configured to separate the two fingers in the initial state from one another in a predetermined first direction to thereby open the two fingers. When the two fingers are opened, the clamp mechanism is configured to approach the two fingers one another in a second direction opposite to the first direction to thereby close the two fingers.

In this assumption, unfortunately, the two fingers of the clamp mechanism would be required to separate from one another such that a separation distance therebetween is wider than the lateral width of a workpiece 2 in order for the two fingers to clamp the workpiece 2. This would make it difficult to arrange workpieces 2 on each edge of the bottom part 6b of the contact prevention sheet 6; each edge of the bottom part 6b of the sheet 6 is adjacent to the corresponding side wall 5a of the container 5.

The packing positions P1 to P20 are categorized into the following three groups:

The first group includes the packing positions P6, P7, P10, P11, P14, and P15, each of which is a packing position that is not adjacent to the inner surface of any side wall 5a of the container 5 via a corresponding side part 6a of the sheet 6.

The second group includes the packing positions P2, P3, P5, P8, P9, P12, P13, P16, P18, and P19, each of which is a packing position that is adjacent to the inner surface of a corresponding one of the side walls 5a of the container 5 via a corresponding side part 6a of the sheet 6.

The third group includes the packing positions P1, P4, P17, and P20, each of which is adjacent to the inner surface of a corresponding pair of adjacent side walls 5a of the container 5 via a corresponding pair of side parts 6a of the sheet 6. In other words, the third group includes the packing positions P1, P4, P17, and P20, each of which is adjacent to a corresponding one of inner corners of the container 5 via a corresponding inner corner part of the sheet 6 covering the corresponding one of the inner corners of the container 5.

The operation controlling unit 12 determines whether the packing position for a workpiece 2 specified by the position specifying unit 11 is located to be adjacent to the inner surface of at least one side wall 5a of the container 5. In other words, the operation controlling unit 12 determines whether the packing position for a workpiece 2 specified by the position specifying unit 11 belongs to the second group or the third group.

In response to determination that the packing position for a workpiece 2 specified by the position specifying unit 11 is located to be adjacent to the inner surface of at least one side wall 5a of the container 5, that is, the packing position for a workpiece 2 specified by the position specifying unit 11 belongs to the second group or the third group, the operation controlling unit 12 performs the sequence of the pick-up process and the packing process while moving the hand 9 of the robot arm 4 downward without entering a predetermined safety zone SZ (see FIG. 3) defined with respect to the at least one side wall 5a of the container 5.

The safety zone SZ represents an internal space of the container 5 defined between the whole inner surface of the at least one side wall 5a and a virtual plane VP that is parallel to the at least one side wall 5a and is separated away therefrom by a predetermined safety distance, i.e., a safety margin, La in a corresponding one of the X and Y directions, which is perpendicular to the at least one side wall 5a and the virtual plane VP.

The safety distance La is previously determined to a distance that ensures the size of the safety zone SZ, which prevents, upon full consideration of the indefinite shape of the sheet 6, the side part 6a of the sheet 6 covering the inner surface of the at least one side wall 5a from interfering with the workpiece 2 picked-up by the hand 9 of the rotor arm 4 during the downward movement of the hand 9 of the robot arm 4.

In particular, in response to determination that the packing position for a workpiece 2 specified by the position specifying unit 11 is located to be adjacent to the inner surface of one side wall 5a of the container 5, that is, the packing position for a workpiece 2 specified by the position specifying unit 11 belongs to the second group, the operation controlling unit 12 performs the sequence of the pick-up process and the packing process while moving the hand 9 of the robot arm 4 downward without entering the predetermined safety zone SZ defined with respect to the one side wall 5a of the container 5.

Additionally, in response to determination that the packing position for a workpiece 2 specified by the position specifying unit 11 is located to be adjacent to the inner surfaces of a pair of adjacent side walls 5a of the container 5, that is, the packing position for a workpiece 2 specified by the position specifying unit 11 belongs to the third group, the operation controlling unit 12 performs the sequence of the pick-up process and the packing process while moving the hand 9 of the robot arm 4 downward without entering both predetermined safety zones SZ respectively defined with respect to the adjacent side walls 5a of the pair.

Otherwise, in response to determination that the packing position for a workpiece 2 specified by the position specifying unit 11 is located not to be adjacent to the inner surface of any side walls 5a of the container 5, that is, the packing position for a workpiece 2 specified by the position specifying unit 11 belongs to the first group, the operation controlling unit 12 performs the sequence of the pick-up process and the packing process while moving the hand 9 of the robot arm 4 downward without considering the safety zone SZ with respect to each side wall 5a.

That is, in response to determination that the packing position for a workpiece 2 specified by the position specifying unit 11 belongs to the first group, the operation controlling unit 12 performs, through the driver 10c, the sequence of the pick-up process and the packing process to:

(1) Instruct the robot arm 4 to rotate to thereby locate the hand 9 of the robot arm 4 to the predetermined pickup position of the belt conveyor apparatus 3 above the conveyor belt 3a (2) Instruct the robot arm 4 to move the hand 9 of the robot arm 4 downward to be close to the predetermined pickup position of the belt conveyor apparatus 3 while a workpiece 2 moves toward the predetermined pickup position of the belt conveyor apparatus 3 above the conveyor belt 3a (3) Instruct the suction mechanisms 9a to suction the workpiece 2 when the workpiece 2 reaches the predetermined pickup position of the belt conveyor apparatus 3 above the conveyor belt 3a, thus picking up the workpiece 2

(4) Instruct the robot arm 4 to move the hand 9 of the robot arm 4 upward to the predetermined height that is, for example, higher by the preset length than the height of the top of the container 5

(5) Instruct the robot arm 4 to rotate to thereby locate the workpiece 2 suctioned by the suction mechanism 9a, i.e., picked-up by the hand 9, of the robot arm 4 directly above the packing position specified by the position specifying unit 11

(6) Instruct the robot arm 4 to move the hand 9 of the robot arm 4 straightly downward to be close to the packing position specified by the position specifying unit 11

(7) Instruct the suction mechanisms 9a to release the suctioning of the picked-up workpiece 2 to thereby detach the picked-up workpiece 2 from the suction mechanisms 9a, so that the detached workpiece 2 is located at the packing position specified by the position specifying unit 11

Next, the following describes the sequence of the pick-up process and the packing process, which will also be referred to as a workpiece packing sequence, with reference to FIGS. 3 to 6. The CPU 10a of the controller 10 reads a previously designed workpiece packing program stored in the storage unit 10b, and cyclically runs the workpiece packing program, thus carrying out the workpiece packing sequence.

Figure 4:
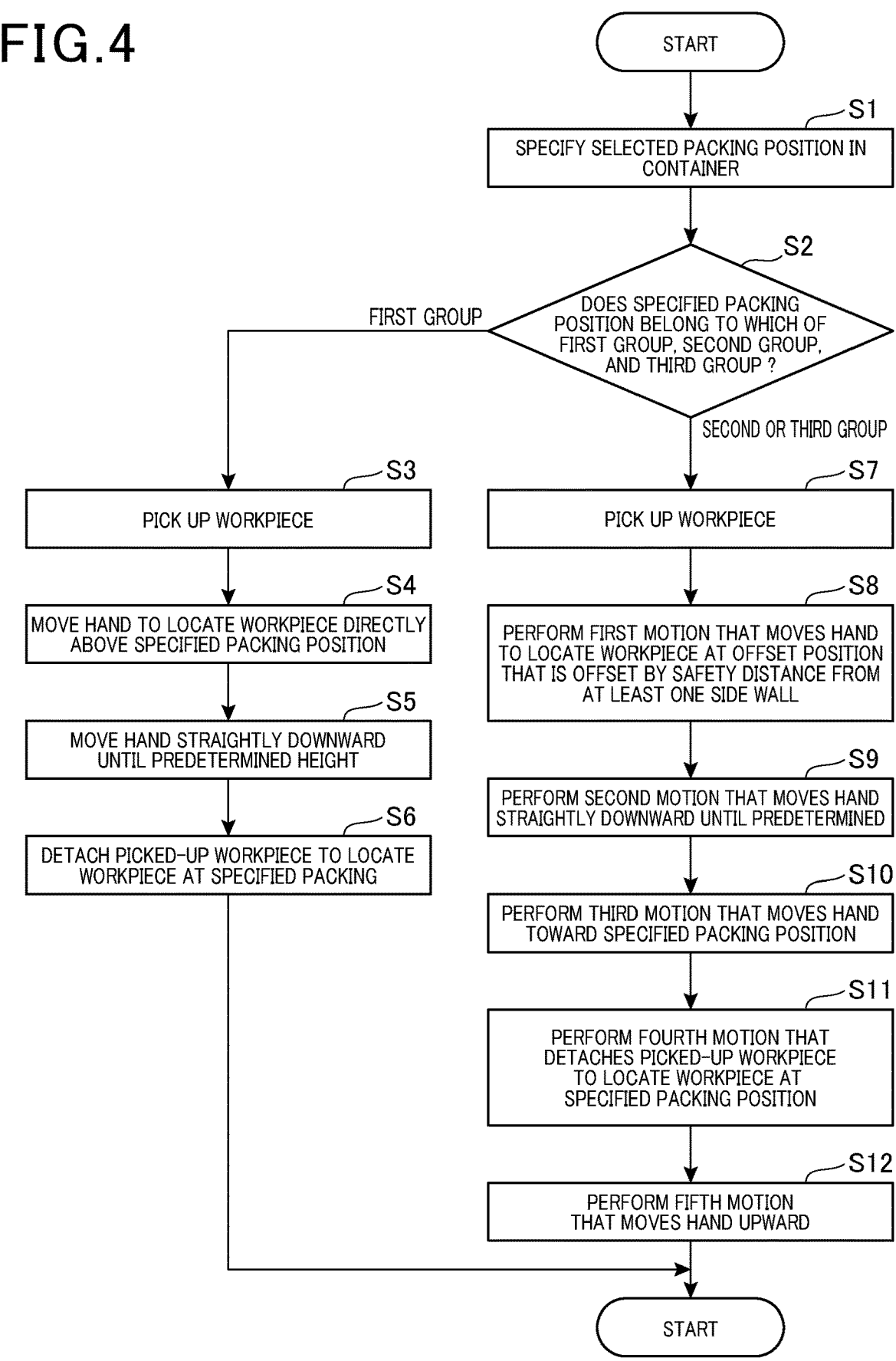
FIG. 4 is a flowchart schematically illustrating a workpiece packing sequence carried out by a controller illustrated in FIG. 1.

When starting a current cycle of the workpiece packing sequence for a target workpiece 2 that approaches the predetermined pickup position of the belt conveyor apparatus 3, the CPU 10a of the controller 10 serves as the position specifying unit 11 to specify a selected packing position on or above the bottom part 6b of the contact prevention sheet 6, which will be referred to simply as a sheet 6, mounted on the bottom wall 5b of the container 5 in step S1 of FIG. 4.

Next, the CPU 10a of the controller 10 serves as the operation controlling unit 12 to determine, in step S2, which of the first group, second group, and the third group that the selected packing position specified by the position specifying unit 11 belongs to.

In response to determination that the selected packing position specified by the position specifying unit 11 belongs to the first group in step S2, the CPU 10a serves as the operation controlling unit 12 to instruct the robot arm 4 to perform the pick-up process, thus picking up a workpiece 2 that reaches the predetermined pickup position of the belt conveyor apparatus 3 in step S3.

Following the operation in step S3, the CPU 10a serves as the operation controlling unit 12 to instruct, through the driver 10c, the robot arm 4, i.e., the arm actuating mechanism AM, to move the hand 9 of the robot arm 4 to thereby locate the workpiece 2 picked-up by the hand 9 of the robot arm 4 directly above the selected packing position specified by the position specifying unit 11 in step S4.

Next, the CPU 10a serves as the operation controlling unit 12 to instruct, through the driver 10c, the robot arm 4 to move the hand 9 of the robot arm 4 straight downward until the picked-up workpiece 2 reaches a predetermined height position in step S5. The predetermined height position is programmed to be set to be higher by a margin height higher than a reference point. The reference point represents one of (1) The top of the uppermost workpiece 2 packed in the selected packing position specified by the position specifying unit 11 if at least one workpiece 2 has been packed in the selected packing position specified by the position specifying unit 11

(2) The bottom part 6b of the sheet 6 if no workpieces 2 have been packed in the selected packing position specified by the position specifying unit 11

The margin height can be set to substantially half of the length of a workpiece 2 in its height direction.

The above description determines a value of the height position for each packing position, but can commonly determine a value of the height position for all the packing positions.

Following the operation in step S5, the CPU 10a serves as the operation controlling unit 12 to instruct, through the driver 10c, the robot arm 4 to release the suctioning of the picked-up workpiece 2 to thereby detach the picked-up workpiece 2 from the suction mechanisms 9a, so that the detached workpiece 2 is located at the packing position specified by the region specifying unit 11 in step S6.

Next, the CPU 10a serves as the operation controlling unit 12 to instruct, through the driver 10c, the robot arm 4 to move the hand 9 of the robot arm 4 straightly upward, and thereafter, terminates the current cycle of the workpiece packing sequence for a target workpiece 2, and performs a next cycle of the workpiece packing sequence for a next target workpiece 2.

Otherwise, in response to determination that the selected packing position specified by the position specifying unit 11 belongs to the second group or third group in step S2, the CPU 10a serves as the operation controlling unit 12 to recognize that the packing position specified by the position specifying unit 11 is adjacent to the inner surface of at least one side wall 5a of the container 5.

Then, the CPU 10a serves as the operation controlling unit 12 to instruct, through the driver 10c, the robot arm 4 to perform the pick-up process, thus picking up a workpiece 2 reaches the predetermined pickup position of the belt conveyor apparatus 3 in step S7.

Following the operation in step S7, the CPU 10a serves as the operation controlling unit 12 to instruct, through the driver 10c, the robot arm 4 to perform a first motion in step S8. The first motion of the robot arm 4 moves the hand 9 to thereby locate an outer edge 2a of the workpiece 2 picked-up by the hand 9 of the robot arm 4, which is the closest to the at least one side wall 5a of the container 5, at an offset position in step S8; the offset position is offset, i.e., shifted, by the safety distance La relative to the at least one side wall 5a in a corresponding one of the X and Y directions.

This operation in step S8 aims to prevent the workpiece 2 picked-up by the hand 9 of the robot arm 4 from entering the safety zone SZ defined with respect to the at least one side wall 5a of the container 5 (see FIG. 3). That is, the operation in step S8 locates the workpiece 2 picked-up by the hand 9 of the robot arm 4 to be offset relative to the directly above position of the packing position specified by the position specifying unit 11.

Next, the CPU 10a serves as the operation controlling unit 12 to instruct, through the driver 10c, the robot arm 4 to perform in a second motion in step S9. The second motion of the robot arm 4 moves the hand 9 straightly downward until the picked-up workpiece 2 reaches the predetermined height position (see FIG. 5). The predetermined height position can be set as in the operation in step S5.

Following the operation in step S9, the CPU 10a serves as the operation controlling unit 12 to instruct, through the driver 10c, the robot arm 4 to perform a third motion in step S10.

The third motion of the robot arm 4 moves the hand 9 toward the packing position specified by the position specifying unit 11, so that the workpiece 2 picked-up by the hand 9 of the robot arm 4 is located at the packing position specified by the position specifying unit 11 in step S10.

Specifically, the third motion of the robot arm 4 causes the hand 9 of the robot arm 4 to move obliquely downward toward the packing position specified by the position specifying unit 11 in step S10. The third motion of the robot arm 4 can cause the hand 9 of the robot arm 4 to move horizontally toward the packing position specified by the position specifying unit 11 in step S10 if no workpieces 2 have been packed in the container 5.

Figure 5:
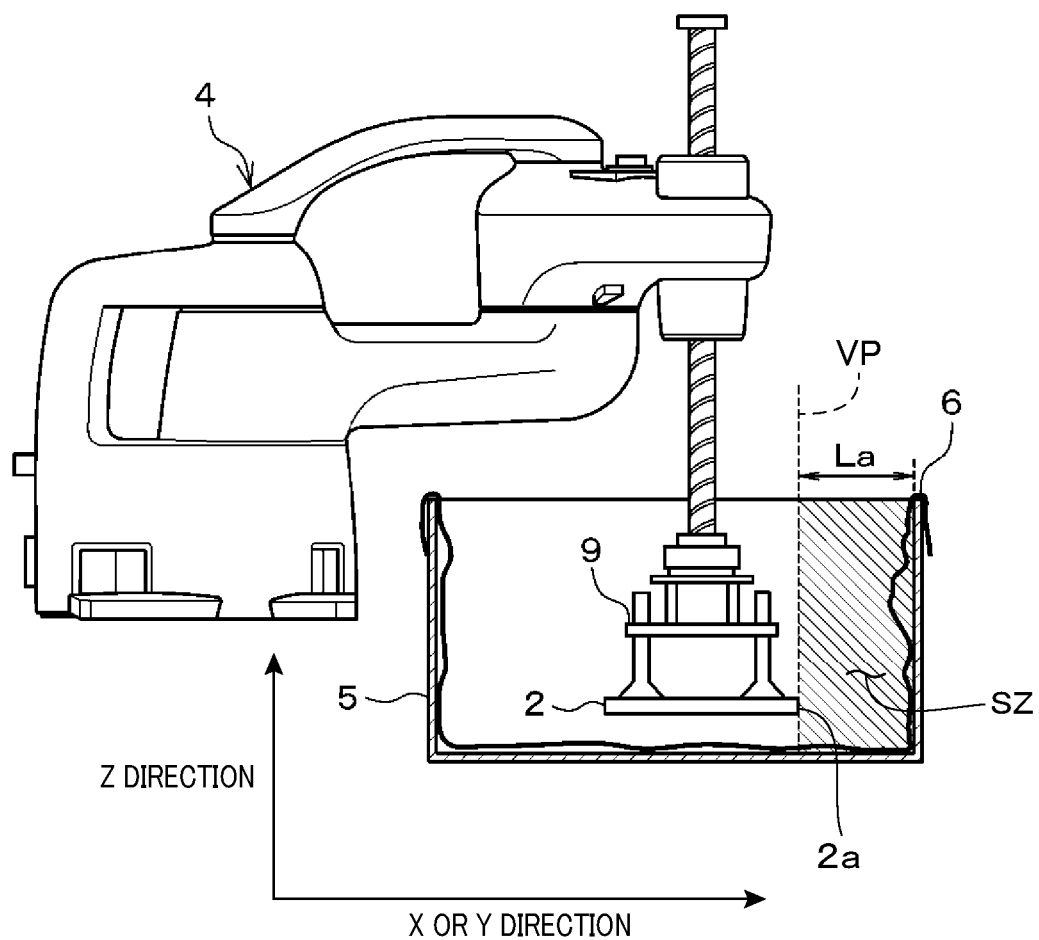
FIG. 5 is a view schematically illustrating how operations of a robot arm illustrated in FIG. 1 are controlled.
Figure 6:
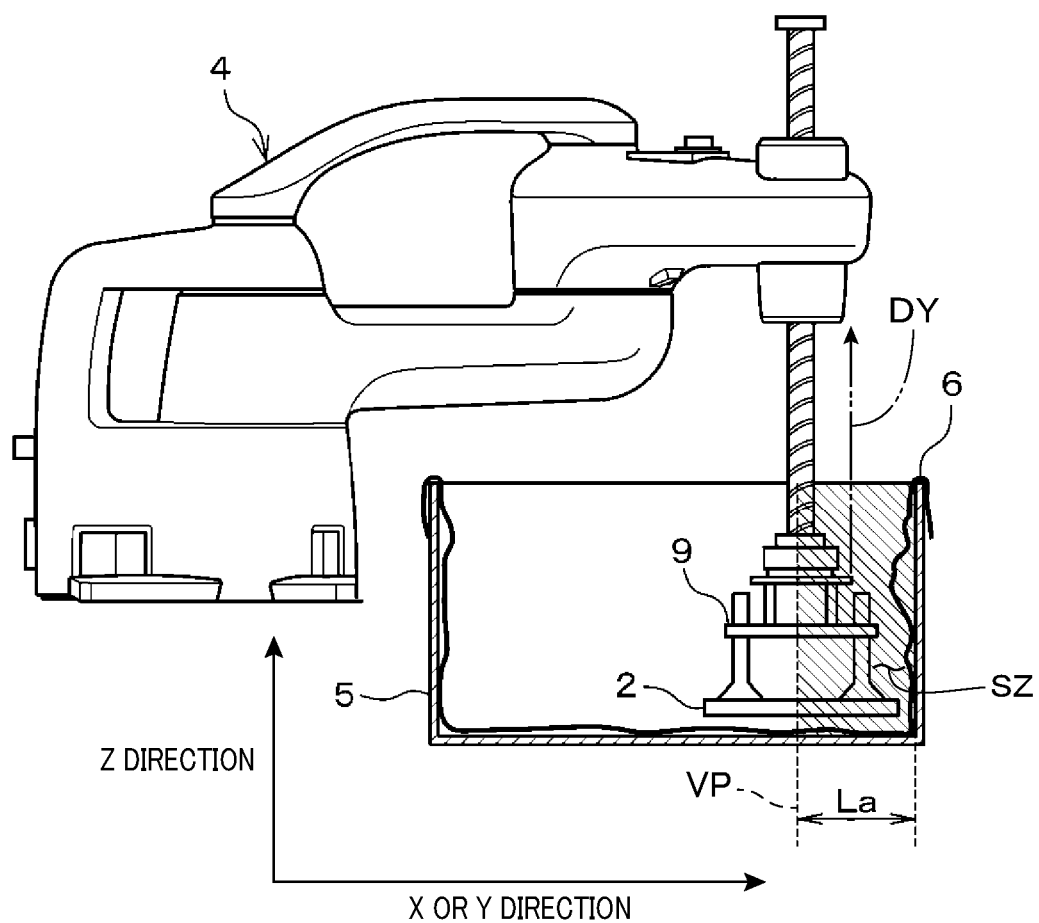
FIG. 6 is a view schematically illustrating how operations of a robot arm illustrated in FIG. 1 are controlled.

The third motion of the robot arm 4 causes, as illustrated in FIG. 6, the workpiece 2 picked-up by the hand 9 of the robot arm 4 and located at the predetermined height position illustrated in FIG. 5 to move sideways to be closer to the at least one side wall 5a of the container 5, thus reaching the packing position specified by the position specifying unit 11.

Following the operation in step S10, the CPU 10a serves as the operation controlling unit 12 to instruct, through the driver 10c, the robot arm 4 to perform a fourth motion that releases the suctioning of the picked-up workpiece 2 by the suction mechanisms 9a of the hand 9 to thereby detach the picked-up workpiece 2 from the suction mechanisms 9a, so that the detached workpiece 2 is located at the packing position specified by the region specifying unit 11 in step S11.

Next, the CPU 10a serves as the operation controlling unit 12 to instruct, through the driver 10c, the robot arm 4 to perform a fifth motion that moves the hand 9 of the robot arm 4 straight upward along the height direction of the container 5 in step S12, and thereafter, terminates the current cycler of the workpiece packing sequence for a target workpiece 2, and performs a next cycler of the workpiece packing sequence for a next target workpiece 2.

The production system 1 configured set forth above therefore achieves the following benefits.

The controller 10 of the exemplary embodiment, which aims to instruct the robot arm 4 to sequentially pack workpieces 2 in the container 5, includes the position specifying unit 11 and the operation controlling unit 12.

The production system 1 uses a water-sensitive rectangular-parallelepiped open container, such as a rectangular-parallelepiped open cardboard container, as the container 5. The inner surfaces of all the side and bottom walls 5a and 5b of the container 5 are covered with the contact prevention sheet 6, such as a plastic sheet or a vinyl-bag sheet.

The position specifying unit 11 is configured to specify a packing position for a workpiece 2 in the container 5.

The operation controlling unit 12 is configured to control, through the driver 10c, operations of the robot arm 4 to cause the robot arm 4 to (1) Pick up a workpiece 2 when the workpiece 2 reaches the predetermined pickup position based on movement of the conveyor belt 3a (2) Locate the picked-up workpiece 2 into the specified packing position in the container 5

If the packing position specified by the specifying unit 11 is adjacent to the inner surface of at least one side wall 5a of the container 5, a workpiece 2 picked-up by the hand 9 of the robot arm 4 may contact with the side part 6a of the contact prevention sheet 6 covering the inner surface of the at least one side wall 5a due to, for example, the indefinite shape of the contact prevention sheet 6.

From this viewpoint, if the packing position specified by the position specifying unit 11 belongs to the second group, which is adjacent to the inner surface of one side wall 5a, the operation controlling unit 12 is configured to control, through the driver 10c, operations of the robot arm 4 to thereby prevent, when moving the picked-up workpiece 2 downward, the picked-up workpiece 2 from entering the predetermined safety zone SZ (see FIG. 3) defined with respect to the one side wall 5a of the container 5.

Additionally, if the packing position specified by the position specifying unit 11 belongs to the third group, which is adjacent to the inner surface of each of a pair of adjacent side walls 5a, the operation controlling unit 12 is configured to control, through the driver 10c, operations of the robot arm 4 to thereby prevent, when moving the picked-up workpiece 2 downward, the picked-up workpiece 2 from entering each of the predetermined safety zones SZ defined with respect to the corresponding one of the pair of adjacent side walls 5a of the container 5.

The safety zone SZ defined with respect to one side wall 5a of the container 5 represents an internal space of the container 5 defined between the whole inner surface of the one side wall 5a and the virtual plane VP that is parallel to the one side wall 5a and is separated away therefrom by the predetermined safety distance La in a corresponding one of the X and Y directions, which is perpendicular to the one side wall 5a and the virtual plane VP.

The safety distance La is previously determined to a distance that ensures the size of the safety zone SZ, which disables, upon full consideration of variations in the indefinite shape of the sheet 6, the side part 6a of the sheet 6 covering the inner surface of the one side wall 5a from interfering with the workpiece 2 picked-up by the hand 9 of the rotor arm 4 during the downward movement of the hand 9 of the robot arm 4.

This configuration sufficiently reduces, even if the packing position for a workpiece 2 is adjacent to the inner surface of one side wall 5a of the container 5, a possibility that the workpiece 2 picked-up by the hand 9 of the robot arm 4 contacts with the side part 6a of the sheet 6 covering the inner surface of the one side wall 5a during downward movement of the workpiece 2 picked-up by the hand 9 of the robot arm 4. This therefore makes it possible to avoid a workpiece 2 from contacting with the side part 6a of the sheet 6 covering each side wall 5a during packing of the workpiece 2 into the container 5.

This prevents the occurrence of
(i) One risk that the workpiece 2 picked up by the hand 9 of the robot arm 4 falls down so that the transportation of the workpiece 2 to the packing position specified by the position specifying unit 11 is failed
(ii) An additional risk that at least the side part 6a of the sheet 6 is detached from the one side wall 5a Setting the length of the safety distance La relative to one side wall 5a of the container 5 to be relatively larger enables the possibility that a workpiece 2 picked-up by the robot arm 4 contacts with the side part 6a of the sheet 6 covering the inner surface of the one side wall 5a to be sufficiently lower during downward movement of the workpiece 2 picked-up by the robot arm 4. Setting the length of the safety distance La relative to one side wall 5a of the container 5 to be relatively longer may however result in the operation time of the robot arm 4, that is, the cycle time required to locate a workpiece 2 picked-up by the robot arm 4 in the container 5, becoming longer.

In contrast, setting the length of the safety distance La relative to one side wall 5a of the container 5 to be relatively shorter prevents the cycle time required to locate a workpiece 2 picked-up by the robot arm 4 in the container 5 from becoming longer, but may not sufficiently reduce the possibility that a workpiece 2 picked-up by the robot arm 4 contacts with the side part 6a of the sheet 6 covering the inner surface of the one side wall 5a during downward movement of the workpiece 2 picked-up by the robot arm 4.

From this viewpoint, the controller 10 has stored in the storage unit 10b and/or in the workpiece packing program a proper value of the safety distance La for balancing both (i) a reduction in the possibility of a picked-up workpiece 2 contacting with the side part 6a of the sheet 6 and (ii) a reduction in the cycle time required to locate a picked-up workpiece 2 in the container 5. For example, the controller 10 has stored in the storage unit 10b and/or in the workpiece packing program a proper value of the safety distance La statistically calculated by the CPU 10a beforehand.

Figure 7:
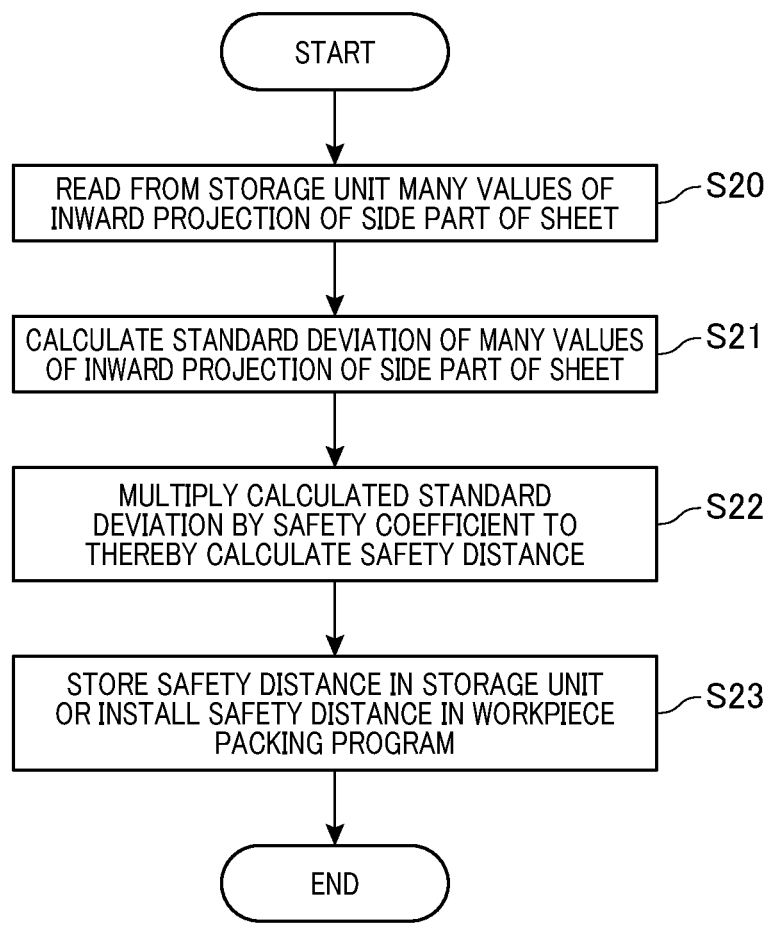
FIG. 7 is a flowchart schematically illustrating a calculation routine carried out by the controller illustrated in FIG. 1.

FIG. 7 schematically illustrates an example of how the CPU 10a statistically calculates a value of the safety distance La as a calculation routine.

Before starting the calculation routine, a worker of the production system 1 repeated a sequence of (i) covering the inner surface of all the side and bottom walls 5a and 5b of the container 5 with the cover 6, and (ii) measuring, for each side wall 5a, a value of an inward projection of the side part 6a of the sheet 6 covering the inner surface of the corresponding side wall 5a relative to the inner surface thereof many times. Then, the worker collected the many values of the inward projection of the side part 6a of the sheet 6 measured by the many repetitions of the sequence. The many collected values of the inward projection of the side part 6a of the sheet 6 measured by the many repetitions of the sequence are stored in the storage unit 10b.

In step S20 of the calculation routine, the CPU 10a reads, from the storage unit 10b, the many collected values of the inward projection of the side part 6a of the sheet 6 measured by the many repetitions of the sequence. Next, the CPU 10a calculates a standard deviation of the many collected values of the inward projection of the side part 6a of the sheet 6 in step S21. Then, the CPU 10a multiplies the calculated standard deviation by a predetermined safety coefficient, thus calculating a value of the safety distance La in step S22, and stores the calculated value of the safety distance La in the storage unit 10b. Then, the CPU 10a stores the calculated value of the safety distance La in the storage unit 10b and/or installs the calculated value of the safety distance La in the workpiece packing program as a value of the variable indicative of the safety distance La in step S23. This enables the CPU 10a to easily prevent the workpiece 2 picked-up by the hand 9 of the robot arm 4 from entering the safety zone SZ defined with respect to the at least one side wall 5a of the container 5 in step S8. After the operation in step S23, the CPU 10a terminates the calculation routine.

Specifically, if the packing position specified by the position specifying unit 11 belongs to the second group or the third group, the operation controlling unit 12 is configured to instruct, through the driver 10c, the robot arm 4 to perform the first motion, the second motion, and the third motion.

The first motion of the robot arm 4 moves the hand 9 to thereby locate the outer edge 2a of the workpiece 2 picked-up by the hand 9 of the robot arm 4, which is the closest to the at least one side wall 5a of the container 5, at the offset position; the offset position is offset, i.e., shifted, by the safety distance La relative to the at least one side wall 5a.

The second motion of the robot arm 4 moves the hand 9 straightly downward until the picked-up workpiece 2 reaches the predetermined height position after the first motion.

The third motion of the robot arm 4 moves the hand 9 toward the packing position specified by the position specifying unit 11, so that the workpiece 2 picked-up by the hand 9 of the robot arm 4 is located at the packing position specified by the position specifying unit 11.

That is, the first motion of the robot arm 4 moves the hand 9 to thereby locate the outer edge 2a of the workpiece 2 picked up by the hand 9 of the robot arm 4, which is the closest to the at least one side wall 5a of the container 5, at the offset position that is offset, i.e., shifted, by the safety distance La relative to the at least one side wall 5a. This therefore reliably prevents the workpiece 2 picked up by the hand 9 of the robot arm 4 from entering the safety zone SZ defined with respect to the at least one side wall 5a of the container 5 during the second motion of the robot arm 4 that moves the hand 9 straightly downward, making it possible to reliably prevent the workpiece 2 picked-up by the hand 9 of the robot arm 4 from contacting with the side part 6a of the sheet 6 covering the at least one side wall 5a.

In particular, the third motion of the robot arm 4 causes the hand 9 of the robot arm 4 to move obliquely downward toward the packing position specified by the position specifying unit 11 or move horizontally toward the packing position specified by the position specifying unit 11.

There may be a concern that the third motion of the robot arm 4 results in the workpiece 2 picked-up by the hand 9 of the robot arm 4 entering the safety zone SZ. The third motion of the robot arm 4 however causes the picked-up workpiece 2 located inside the container 5 to move sideways to be closer to the at least one side wall 5a of the container 5, making it possible to prevent the workpiece 2 picked-up by the hand 9 from falling down from the hand 9 and/or the sheet 6 from detaching from the container 5.

In particular, as described above, if the packing position specified by the position specifying unit 11 is adjacent to one inner corner of the container 5, that is, one of the packing positions P1, P4, P17, and P20 is specified by the position specifying unit 11, the specified packing position is located to be adjacent to the inner surfaces of respective adjacent first and second sidewalls 5a that face the specified packing position. This therefore requires the operation controlling unit 12 to avoid the workpiece 2 from contacting with the side part 6a of the sheet 6 covering the inner surface of each of the adjacent first and second sidewalls 5a during packing of the workpiece 2 into the container 5.

From this requirement, the operation controlling unit 12 of the CPU 10a instructs, through the driver 10c, the robot arm 4 to move the hand 9 of the robot arm 4 downward without entering two safety zones SZ1 and SZ2.

Figure 8:
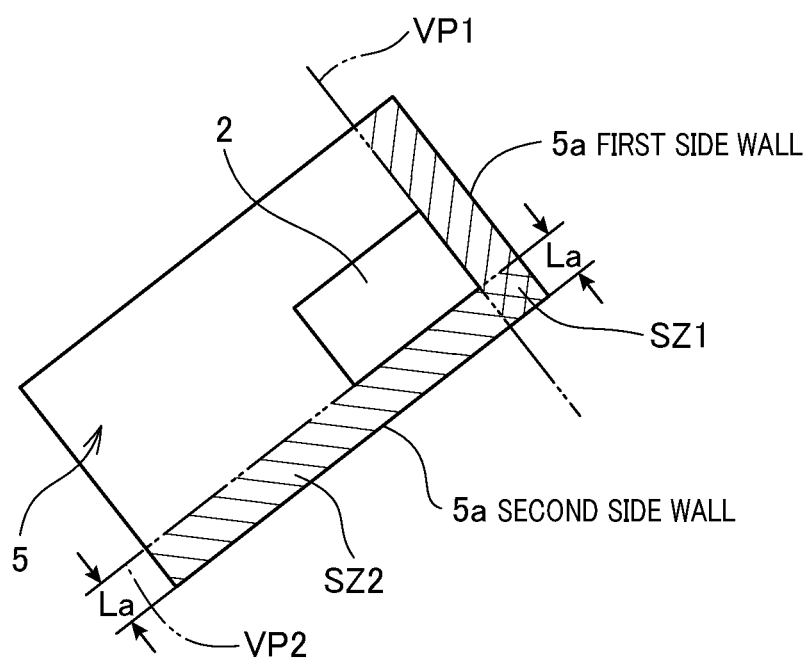
FIG. 8 is a view schematically illustrating first and second safety zones according to the exemplary embodiment of the present disclosure.

The first safety zone SZ1 represents an internal space of the container 5 defined between the whole inner surface of the first side wall 5a and a first virtual plane VP1 that is parallel to the first side wall 5a and is separated away therefrom by the predetermined safety distance La in a corresponding one of the X and Y directions (see FIG. 8).

Similarly, the second safety zone SZ2 represents an internal space of the container 5 defined between the whole inner surface of the second side wall 5a and a second virtual plane VP2 that is parallel to the second side wall 5a and is separated away therefrom by the predetermined safety distance La in a corresponding one of the X and Y directions (see FIG. 8).

This therefore prevents, even if the specified packing position for a workpiece 2 is adjacent to an inner corner of the container 5, the workpiece 2 from contacting with the side parts 6a of the sheet 6 covering the respective two adjacent side walls 5a of the container 5 during packing of the workpiece 2 into the container 5.

If the packing position specified by the position specifying unit 11 belongs to the second group or the third group, the operation controlling unit 12 is configured to instruct, through the driver 10c, the robot arm 4 to perform the fifth motion after the workpiece 2 is located at the packing position specified by the region specifying unit 11 based on the fourth motion of the robot arm 4.

The fifth motion that moves the hand 9 of the robot arm 4 straightly upward (see the dashed-two dotted arrow DY) along the Z direction, i.e., the height direction of the container 5. That is, although the hand 9 of the robot arm 4 rises immediately above with a part of the hand 9 being within the safety zone SZ, because no workpiece 2 is grasped by the rising hand 9, there is no need of considering contact between the workpiece 2 and the side part 6a of the sheet 6 covering the at least one side wall 5a of the container 5.

This therefore reduces the operation time of the robot arm 4 after the workpiece 2 is located at the packing position specified by the region specifying unit 11, resulting in a total cycle time required to locate twenty workpieces 2 over the respective packing positions P1 to P20 being shorter.

In particular, as described above, the size of the square outline of the nozzles of the four suction mechanisms 9a in cross section of the X-Y plane is smaller than the size of the workpiece 2 in cross section of the X-Y plane (see FIG. 3). For this reason, even if the hand 9 of the robot arm 4 rises immediately upward, the hand 9 is less likely to contact with the side part 6a of the sheet 6 covering the at least one side wall 5a of the container 5.

Other Embodiments or Modifications

The present disclosure is not limited to the exemplary embodiment set forth above, and can be variously modified, combined with known technologies, or enlarged within the scope of the present disclosure.

Specific numerical values used in the exemplary embodiment doe do not limit the scope of the present disclosure.

The exemplary embodiment uses the contact prevention sheet 6 is used, but can use a sheet having an indefinite shape, i.e., a changeable shape. For example, a bubble wrap sheet can be used as the contact prevention sheet.

The position specifying unit 11 is configured to sequentially specify the packing positions P1 to P20 from the packing position P1 in ascending order up to the packing position P20, but can be configured to freely specify the packing positions within the scope the present disclosure that aims to prevent a workpiece 2 picked up by the robot arm 4 from contacting with a part of the contact prevention sheet 6, which covers at least one side wall 5a of the rectangular-parallelepiped open container 5.

The operation controlling unit 12 is configured to control operations of the robot arm 4 in the workpiece packing sequence illustrated in FIG. 4, but can be configured to freely control operations of the robot arm 4 within the scope of the present disclosure that aims to prevent a workpiece 2 picked up by the robot arm 4 from contacting with a part of the contact prevention sheet 6, which covers at least one side wall 5a of the rectangular-parallelepiped open container 5.

The exemplary embodiment uses, as the end effector of the robot arm 4, the hand 9 with the suction mechanisms 9a, but the present disclosure is not limited thereto. Specifically, the present embodiment can use another type of end effector of the robot arm 4, which is capable of manipulating a workpiece 2.

Another type of open container can be used as the box-shaped open container 5 as long as it has a bottom wall and at least one side wall, such as a hollow cylindrical open container.

The present disclosure is not limited to the controller 10 for the robot arm 4 applicable to the production system 1. Specifically, the present disclosure can include various apparatuses for controlling one or more robot arms to thereby pack workpieces in a box-shaped open container with a bottom wall and at least one side wall; an inner wall of each of the bottom and side walls is covered with a contact prevention sheet having an indefinite shape.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a robot arm with an end effector for packing one or more workpieces in a box-shaped open container, the apparatus comprising:
    a position specifying unit configured to specify a position in the box-shaped open container at which a selected workpiece among the one or more workpieces is located, the box-shaped open container having a bottom wall and at least one side wall that extends to a top of the box-shaped open container, an inner surface of the at least one side wall being covered, from the top, with a contact prevention sheet having an indefinite and changeable shape, the contact prevention sheet preventing direct contact between the selected workpiece and the inner surface and being put on the top of the container without being completely fixed thereto such that the contact prevention sheet covers the top and the inner surface; and
    an operation controlling unit configured to:
        statistically calculate a predetermined safety distance based on a plurality of values of an inward projection of a side part of the contact prevention sheet that covers the top and the inner surface of the at least one side wall, the predetermined safety distance being for preventing the selected workpiece from interfering with the contact prevention sheet;
        instruct the robot arm to pick up the selected workpiece with the end effector;
        determine whether the position specified by the position specifying unit in the box-shaped open container is adjacent to the inner surface of the at least one side wall of the container; and
        instruct the robot arm to move the selected workpiece picked up by the end effector of the robot arm downward while preventing the selected workpiece picked up by the end effector of the robot arm from entering a predetermined safety zone in response to a determination that the specified position in the box-shaped open container is adjacent to the inner surface of the at least one side wall of the container, wherein the safety zone represents an internal space of the box-shaped open container defined between the inner surface of the at least one side wall and a virtual plane that is parallel to the at least one side wall and is separated away therefrom by the predetermined safety distance in a horizontal direction perpendicular to the at least one side wall and the virtual plane, and wherein the operation controlling unit is further configured to, in response to the determination that the specified position in the box-shaped open container is adjacent to the inner surface of the at least one side wall of the container, instruct the robot arm to perform:
    a first motion that moves the end effector to thereby locate an outer edge of the selected and picked-up workpiece, which is closest to the at least one side wall of the box-shaped open container, at an offset position, the offset position being offset by the safety distance relative to the at least one side wall of the box-shaped open container in the horizontal direction thereof;
    a second motion that moves the end effector straight downward until the selected and picked-up workpiece reaches a predetermined height position in a height direction of the box-shaped open container; and
    a third motion that moves the end effector toward the specified position into the box-shaped open container.

2. The apparatus according to claim 1, wherein:
the box-shaped open container has a first side wall as the at least one side wall, and the box-shaped open container has a second side wall adjacent to the first side wall; and
the predetermined safety zone comprises a first safety zone and a second safety zone,
    the first safety zone representing a first internal space of the container defined between an inner surface of the first side wall and a first virtual plane that is parallel to the first side wall and is separated away therefrom by, as the predetermined safety distance, a predetermined first safety distance in a first horizontal direction perpendicular to the first side wall and the first virtual plane,
    the second safety zone representing a second internal space of the container defined between an inner surface of the second side wall and a second virtual plane that is parallel to the second side wall and is separated away therefrom by, as the predetermined safety distance, a predetermined second safety distance in a second horizontal direction perpendicular to the second side wall and the second virtual plane; and
the operation controlling unit is configured to:
    instruct the robot arm to move the selected and picked-up workpiece downward while preventing the selected and picked-up workpiece from entering each of the first safety zone and the second safety zone in response to a determination that the specified position in the box-shaped open container is adjacent to the inner surface of the first side wall and the inner surface of the second side wall of the box-shaped open container.

3. The apparatus according to claim 1, wherein
the operation controlling unit is configured to, in response to the determination that the specified position in the box-shaped open container is adjacent to the inner surface of the at least one side wall of the container, instruct the robot arm to perform:
- a fourth motion that releases the selected and picked-up workpiece to thereby detach the selected and picked-up workpiece, so that the detached workpiece is located at the specified position; and
- a fifth motion that moves the end effector of the robot arm straightly upward along the height direction of the box-shaped open container after the fourth motion.

4. The apparatus according to claim 1, wherein the operation controlling unit is configured to:
- calculate a standard deviation of the plurality of values of the inward projection of the side part of the contact prevention sheet; and
- multiply the calculated standard deviation by a predetermined safety coefficient, thus calculating a value of the safety distance.

5. The apparatus according to claim 1, comprising a processor programmed to function as the position specifying unit and the operation controlling unit.

6. The apparatus according to claim 1, wherein the contact prevention sheet follows a contour of the bottom wall and the at least one side wall even before any of the one or more workpieces are packed in the box-shaped open container.

7. The apparatus according to claim 1, wherein a margin of the contact prevention sheet that projects from the top of the at least one side wall is folded outward so as to wrap around the top of the at least one side wall and to extend downward along an outer surface of the at least one side wall from the top.

8. A computer-implemented method for controlling a robot arm with an end effector for packing one or more workpieces in a box-shaped open container, the computer-implemented method comprising:
- statistically calculating a predetermined safety distance based on a plurality of values of an inward projection of a side part of a contact prevention sheet that covers both a top of and an inner surface of at least one side wall of the box-shaped open container, the predetermined safety distance being for preventing any of the workpieces from interfering with the contact prevention sheet, while being packed into the box-shaped open container;
- specifying a position in the box-shaped open container at which a selected workpiece among the one or more workpieces is located, the box-shaped open container having a bottom wall and the at least one side wall that extends to the top of the box-shaped open container, the inner surface of the at least one side wall being covered, from the top, with the contact prevention sheet having an indefinite and changeable shape, the contact prevention sheet preventing direct contact between the selected workpiece and the inner surface and being put on the top of the container without being completely fixed thereto such that the contact prevention sheet covers the top and the inner surface;
- instructing the robot arm to pick up the selected workpiece with the end effector;
- determining whether the specified position in the box-shaped open container is adjacent to the inner surface of the at least one side wall of the container; and
- instructing the robot arm to move the selected and picked-up workpiece downward while preventing the selected and picked-up workpiece from entering a predetermined safety zone in response to a determination that the specified position in the box-shaped open container is adjacent to the inner surface of the at least one side wall of the container,
- wherein the safety zone represents an internal space of the container defined between the inner surface of the at least one side wall and a virtual plane that is parallel to the at least one side wall and is separated away therefrom by the predetermined safety distance in a horizontal direction perpendicular to the at least one side wall and the virtual plane.

9. The method according to claim 8, wherein in response to the determination that the specified position in the box-shaped open container is adjacent to the inner surface of the at least one side wall of the container, the method further comprises instructing the robot arm to perform:
- a first motion that moves the end effector to thereby locate an outer edge of the selected and picked-up workpiece, which is closest to the at least one side wall of the box-shaped open container, at an offset position, the offset position being offset by the safety distance relative to the at least one side wall of the box-shaped open container in the horizontal direction;
- a second motion that moves the end effector straight downward until the workpiece picked up by the end effector reaches a predetermined height position in a height direction of the box-shaped open container; and
- a third motion that moves the end effector toward the specified position in the box-shaped open container.

10. A non-transitory computer-readable medium storing instructions that, when executed by a computer for an apparatus for controlling a robot arm with an end effector for packing one or more workpieces in a box-shaped open container, cause the computer to execute functions comprising:
- statistically calculating a predetermined safety distance based on a plurality of values of an inward projection of a side part of a contact prevention sheet that covers both a top of and an inner surface of at least one side wall of the box-shaped open container, the predetermined safety distance being for preventing any of the workpieces from interfering with the contact prevention sheet, while being packed into the box-shaped open container;
- specifying a position in the box-shaped open container at which a selected workpiece among the one or more workpieces is located, the box-shaped open container having a bottom wall and the at least one side wall that extends to the top of the box-shaped open container, the inner surface of the at least one side wall being covered, from the top, with the contact prevention sheet having an indefinite and changeable shape, the contact prevention sheet preventing direct contact between the selected workpiece and the inner surface and being put on the top of the container without being completely fixed thereto such that the contact prevention sheet covers the top and the inner surface;
- instructing the robot arm to pick up the selected workpiece with the end effector;
- determining whether the specified position in the box-shaped open container is adjacent to the inner surface of the at least one side wall of the container; and
- instructing the robot arm to move the selected and picked-up workpiece downward while preventing the selected and picked-up workpiece from entering a predetermined safety zone in response to a determination that the specified position is adjacent to the inner surface of the at least one side wall of the box-shaped open container, wherein the safety zone represents an internal space of the container defined between the inner surface of the at least one side wall and a virtual plane that is parallel to the at least one side wall and is separated away therefrom by the predetermined safety distance in a horizontal direction perpendicular to the at least one side wall and the virtual plane.

* * * * *